Dec. 31, 1957 J. S. WATSON 2,818,379
PRODUCTION OF TETRAALKYLHYDRAZINES
Filed Feb. 15, 1955
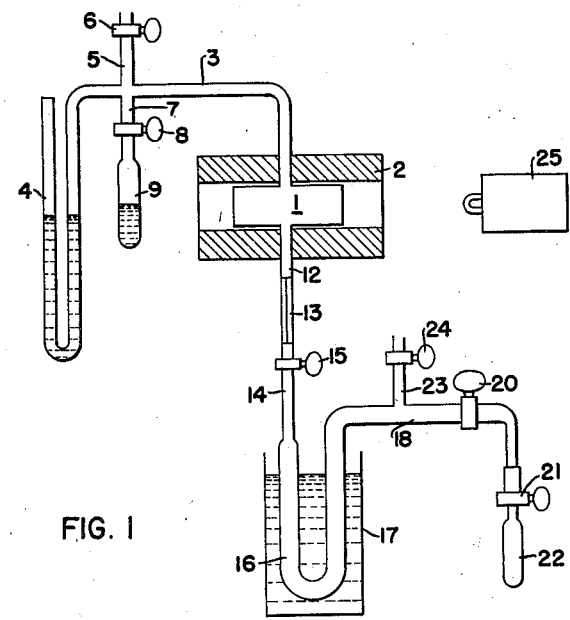
FIG. 1
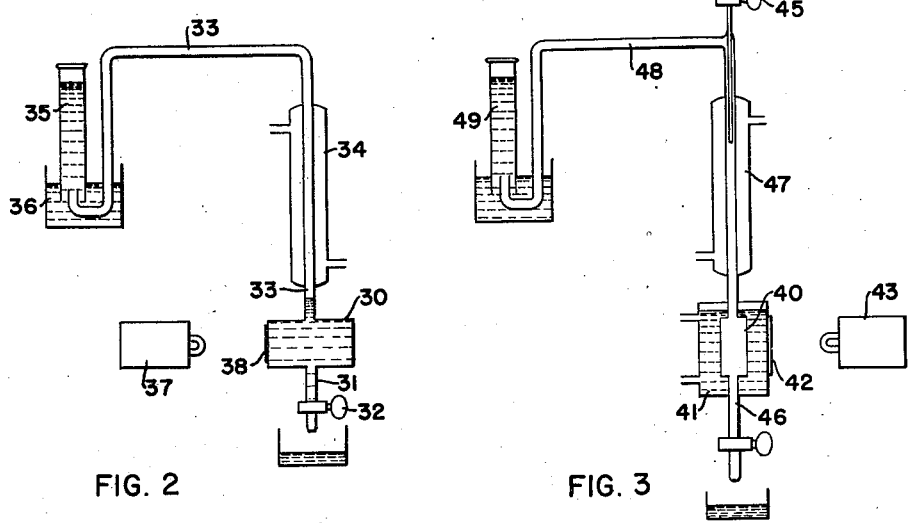
FIG. 2
FIG. 3
INVENTOR
JAMES S. WATSON
BY
Pennie, Edmonds, Morton, Barrows + Taylor
ATTORNEYS 2,818,379
Patented Dec. 31, 1957

2,818,379

PRODUCTION OF TETRAALKYLHYDRAZINES

James S. Watson, Hamden, Conn., assignor to Olin Mathieson Chemical Corporation, New Haven, Conn., a corporation of Virginia Application February 15, 1955, Serial No. 488,283

7 Claims. (Cl. 204—158)

This invention relates to the preparation of tetraalkylhydrazine, and has for its object the provision of a process for the decomposition of tetraalkyltetrazene in which the alkyl group has from 1 to 4 carbon atoms to produce tetraalkylhydrazine in which the alkyl group has from 1 to 4 carbon atoms. In accordance with the process of the invention the tetraalkyltetrazene is subjected to photolysis with light at a suitable wave length resulting in its decomposition and the production of tetraalkylhydrazine.

The tetraalkyltetrazene subjected to the photolysis treatment is in the vapor or liquid phase, preferably when in a higher state of dispersion than when the compound is a liquid, for example, in the gas phase or in solution in an organic solvent. Because of the operating efficiency and relatively higher yield I prefer to carry out the operation in the gas phase. While the process of the invention is advantageously applicable to the decomposition of tetramethyltetrazene, it is also applicable to the decomposition of the tetraethyl-, tetrapropyl- and tetrabutyl-tetrazenes, resulting in the production of the corresponding tetraalkylhydrazine.

The process of the invention comprises a photolytic decomposition of the tetraalkyltetrazene, preferably carried out under controlled conditions of wave length, time, and temperature for the production of tetraalkylhydrazine in good yield. In carrying out a process of the invention the tetraalkyltetrazene is subject to light having a wave length of from 2500 to 4000 Angstrom units, at a temperature of from 0° C. to 124° C., and preferably for from 30 seconds to 60 minutes. The upper temperature limit of 124° C. is just below the temperature at which tetraalkyltetrazene explodes. The irradiation is most conveniently carried out in the vapor phase at the vapor pressure of the liquid tetrazene, and in the liquid or solution phase at atmospheric pressure. Under appropriately controlled conditions the decomposition products of tetramethyltetrazene may contain 80 percent or more of tetramethylhydrazine.

The process of the invention will be described hereinafter with reference to the production of tetramethylhydrazine, and it is to be understood that the process is applicable also to the production of the other tetraalkylhydrazines aforementioned. The major products of the decomposition at the temperature of treatment of tetramethyltetrazene are tetramethylhydrazine (T. M. H.) and nitrogen ($N_2$). It appears that the decomposition reaction product also includes minor amounts of dimethylamine (D. M. A.), and tetramethylmethylenediamine (T. M. M. D.). The tetramethylmethylenediamine apparently is not a primary product since its percentage appears to be nil initially. Also, the percentage of tetramethylhydrazine decreases with the time of illumination and with increasing temperature, while the percentage of dimethylamine does not decrease with decreasing time of illumination.

The accompanying drawings illustrate more or less diagrammatically arrangements of apparatus suitable for carrying out processes of the invention, in which:

Fig. 1 is a perspective of apparatus suitable for carrying out the process in the gas phase;

Fig. 2 is a side elevation of apparatus suitable for carrying out the process in the liquid phase with the tetraalkyltetrazene in solution, and Fig. 3 is a side elevation of another apparatus for carrying out the process in liquid phase.

The apparatus illustrated in Fig. 1 comprises a cylindrical quartz reaction cell 1, enclosed in a concentric furnace 2, and connected by suitable tubing 3 to a manometer 4 containing mercury, a branch 5 having a valve 6 which is connected to a high vacuum system (not shown), and a branch 7 which connects through valve 8 to a reservoir 9 for liquid tetramethyltetrazene. The reaction cell is also connected by tubing 12 to the capillary 13 and by tubing 14 through valve 15 to the U-shaped vessel 16 which is cooled with liquid nitrogen in the surrounding chamber 17. The vessel 16 is connected through tubing 18, valves 20 and 21 to storage vessel 22. The branch 23 connects through valve 24 to the high vacuum system.

Light of a suitable wave length is obtained from a Hanovia model SH (L) quartz medium pressure mercury lamp 25 placed on the outside of the furnace 2 and near an opening therein. The lamp is located so that the rays pass directly into the reaction cell. It is not necessary to collimate or filter the light. With the exceptions of the quartz cell, lamp and the furnace, the apparatus can be made of glass, for example, Pyrex glass.

In carrying out a process of the invention in the apparatus of Fig. 1, tetramethyltetrazene from any suitable source may be used. $(CH_3)_2N.NH_2$ may be prepared, for example, by the procedure of H. H. Hatt described in Org. Syntheses, collected vol. 2, p. 211 (1950), which yields the tetrazene on treatment with $H_gO$ (Renouf, Ber. 13, 2173, 1880).

In carrying out the process of the invention the tetramethyltetrazene in chamber 9 is frozen with a surrounding body of liquid nitrogen (not shown) to minimize the escape of vapor and the valves 6, 8, 15, 20, 21 and 24 are opened for the complete evacuation of the apparatus. Valves 6, 20, 21 and 24 are then closed and the tetramethyltetrazene allowed to warm up to about 25° C. at a pressure of about 8 mm. of Hg. The light is switched on and the rays varying from 2500 to 4000 Angstrom units are passed into the reaction cell. Valve 15 is opened and the vaporous tetramethyltetrazene is allowed to distill slowly through the reaction cell and the products of decomposition through the capillary 13. The capillary serves as a throttle regulating the flow of products into and through the reaction cell. The products of decomposition pass into the reservoir 16 where the condensable compounds are liquefied. By closing valve 15 and opening valve 24, the nitrogen is removed through the vacuum system. Valve 24 is then closed and the products in reservoir 16 are distilled into vessel 22 from which they can be fractionated as described hereinafter. While the aforementioned operation is carried out in batches with the tetramethyltetrazene vapors passing in a stream of relatively short duration, the invention contemplated carrying out the operation more or less continuously.

The following table gives the results of analytical determinations made on the tetramethylhydrazine produced.

Table I

|  | Observed | Literature |
|---|---|---|
| Refractive Index | $n_D^{25}$=1.4040 | $n_D^{25}$=1.4040[4] |
| Vapor pressure | 100 mm. Hg (25° C.) | not available. |
| Boiling point | 73° C. at 760 mm | 73° C. at 730 mm.[4] |
| Analysis: | | |
| Percent C | 53.5 } found | 54.5 } calculated. |
| Percent H | 13.3 | 13.7 |
| Percent N | 33.2 | 31.8 |
| CS₂ complex—M. P. | 130° C | not known. |
| Mass spectrum | parent peak 88, base peak 44 | not available. |

The effects of time and temperature, and to a lesser extent pressure, on the rate and nature of the products of the reaction were investigated in a system having a volume of 200 cc. with the results shown in Table II. In the operation at 25° C. the initial pressure was constant at 8 mm. but the pressure of tetramethyltetrazene (T. M. T.) decreased with increasing time, because of the reaction, and, after 40 minutes, it had almost completely vanished. During the operation the total pressure increased continuously to the end of the reaction, the final pressure being about 125% of the initial pressure.

Table II

| Temp. (° C.) | Press. mm. (Hg) | Duration (mins.) | Rate N₂ (mm. min—110×²) | Condensible Products, percent | | |
|---|---|---|---|---|---|---|
| | | | | (D. M. A.) | (T. M. H.) | (T. M. M. D.) |
| 25 | 8 | 5 | 8 | 19 | 80 | 1.3 |
| 25 | 8 | 10 | 7 | 17 | 80 | 2.8 |
| 25 | 8 | 24 | 7 | 20 | 76 | 4.0 |
| 25 | 8 | 40 | | 21 | 73 | 6.5 |
| 51 | 32 | 5 | 9 | 23 | 73 | 4.1 |
| 80 | 8 | 20 | 6 | 24 | 72 | 3.7 |
| 124 | 10 | 19 | 6 | 32 | 61 | 8.0 |

The results in Table II show that, at 25° C., the rate of production of nitrogen (N₂) did not decrease significantly as the reaction progressed. This is understandable since the very large extinction coefficient of tetramethyltetrazine (Table I) causes essentially all the incident light to be absorbed even when the pressure is very low. The rate then appears to depend only on the absorbed intensity. It is also evident that the rate of production of nitrogen is not sensitive to temperature between 25° and 124° C. On the other hand, there do appear to be small but significant changes in the nature of the products with changes in temperature and duration of the operation. Thus at 25° C. the percentage of tetramethylmethylenediamine (T. M. M. D.) increases approximately 4-fold between 5 and 40 minutes and it appears that that substance is entirely absent from the products at very short times; the percentage of tetramethylhydrazine (T. M. H.) appears to decrease, by an amount approximately equal to that by which tetramethylmethylenediamine (T. M. M. D.) increases, over the course of the reaction. An increase in temperature appears to increase the percentage of dimethylamine (D. M. A.) and to decrease that of tetramethylhydrazine (T. M. H.) in the products.

The products of the gas-phase reactions were separated into five fractions, each of which was either measured as a gas or weighed as non-volatile liquid. The individual fractions were then treated as follows:

*Fraction 1.*—The gas uncondensable at —195° C. was examined mass-spectrometrically and found to be essentially pure nitrogen in all cases.

*Fraction 2.*—The gas condensable at —195° C. and volatile at 25° C. was found by mass spectrometric analysis to be largely dimethylamine. Occasionally small amounts of monomethylamine were also found. The dimethylamine was further characterized by its vapor pressure (2.8 mm. at —78° C.) and the melting point of the picrate (158° C.).

*Fraction 3.*—The liquid fraction in the boiling range, 70°–75° C. at atmospheric pressure, consisted essentially of tetramethylhydrazine and small amounts of tetramethylmethylenediamine and was analysed mass-spectrometrically. After two or three further fractionations the liquid was found to be essentially pure tetramethylhydrazine, the properties of which are listed in Table I.

*Fraction 4.*—The liquid boiling at 40°–42° C. at 30 mm. Hg was unchanged tetramethyltetrazene recognized by its boiling point 40° C. at 30 mm. Hg and by its refractive index $n_D^{25}$=1.4640.

*Fraction 5.*—The liquid fraction in the boiling range 63°–66° C. at 25 mm. Hg was essentially pure trimethyltrimethylenetriamine and was identified by the following properties: boiling point—64–65° C. at 25 mm. Hg; refractive index $n_D^{25}$=1.4600; CS₂ complex—M. P.= 102° C.; picrate—M. P.=118° C.; mass spectrum—parent peak at mass No. 129.

The apparatus illustrated in Fig. 2 comprises a quartz reaction vessel or cell 30 having a drain tube 31 and stopcock 32 at the bottom for the removal from the cell of the liquid products of decomposition. The cell is connected through suitable tubing 33 to the reflux condenser 34. The condenser is connected by the tubing 33 to the inverted graduated cylinder 35, the open end of which is immersed in N/20 hydrochloric acid in the trough 36 which is a trap for collecting nitrogen. A Hanovia model SH (L) quartz medium pressure mercury lamp 37 is located in front of a quartz plate and shutter 38 on the reaction cell 30 so that the light will pass into the cell.

In carrying out an operation of the invention in which the tetramethyltetrazene was decomposed by photolysis in the liquid phase in solution, in the apparatus of Fig. 2, the quartz cell 30 was filled with a solution containing ten grams of tetramethyltetrazene dissolved in 200 cc. of dry ether. Other suitable solvents may be used, such as dioxane. The lamp was turned on and the shutter between the lamp and the cell was closed. The heat generated by the lamp caused the liquid to boil and reflux. When conditions were constant, the apparatus was connected to the gas-collecting system 33, 35 and 36 and the shutter was opened. The reaction was carried on for about 13 hours. The gaseous products passed through the reflux condenser and the amine dissolved in the acidified water in trough 36 while the nitrogen was collected in the graduated cylinder 35. The current to the lamp was adjusted so that gentle refluxing action was obtained. After irradiation, the products remaining in the cell were separated by distillation at atmospheric pressure. The products consisted of 1.5 liters of nitrogen, 3 grams of unchanged tetramethyltetrazene, and 1.3 grams of a fraction boiling at about 80° C. of which 0.3 gram was tetramethylmethylenediamine and 1.0 gram was tetramethylhydrazine.

When dioxane is used as the solvent, it is possible to use higher currents, and consequently higher intensities, than when ethyl ether is used. In these solution phase operations the lamp was placed at a fixed distance of about 2.5 cm. from the cell, and a wave length of about 3000 Angstrom units was used.

The apparatus of Fig. 3 can be used for the treatment of a solution but is primarily advantageous for the photolysis of liquid tetramethyltetrazene and is generally similar to that of Fig. 2, the main difference being that the reaction cell 40 is smaller and is surrounded by a water jacket 41 to maintain the liquid tetramethyltetrazene at a preferred temperature of about 25° C. The quartz window 42 allows rays from the mercury lamp 43 to pass into the cell which, for the treatment of the liquid, are about 2800 Angstrom units. The liquid tetramethyltetrazene is supplied from the reservoir 44 through the valve-controlled tube 45, and the liquid products of decomposition are withdrawn through valve-controlled tube 46 while the nitrogen passes through the condenser 47 and tube 48 to the nitrogen trap 49, which is similar to the trap of Fig. 2. The operation may be carried out by allowing a continuous controlled stream of tetramethyltetrazene to flow into the cell 40 and to withdraw the liquid decomposition products continuously through tube 46.

In carrying out operations according to the invention, the nitrogen gas evolved is in direct proportion to the tetrazene decomposed. Therefore, the reaction can be followed or controlled by measuring the rate of nitrogen evolution.

I claim:

1. The process of producing tetraalkylhydrazine in which the alkyl group has from 1 to 4 carbon atoms which comprises subjecting tetraalkyltetrazene in which the alkyl group contains from 1 to 4 carbon atoms to photolysis with rays of wave length in the range of from 2500 to 4000 Angstrom units at a temperature below 124° C.

2. In the process of claim 1 carrying out the photolysis for a time not to exceed 10 minutes.

3. In the process of claim 2 carrying out the process at a temperature of from 0° C. to 124° C. and for a time not to exceed 24 minutes.

4. In the process of claim 1 subjecting the tetraalkyltetrazene dissolved in an organic solvent to the photolytic decomposition.

5. In the process of claim 1, subjecting the solution at substantially refluxing temperature to photolysis.

6. The process of producing tetralkylhydrazine in which the alkyl group has from 1 to 4 carbon atoms which comprises subjecting tetraalkyltetrazene in which the alkyl group contains from 1 to 4 carbon atoms in liquid phase to photolysis with rays of about 2800 Angstrom units at a temperature below 124° C.

7. In the process of claim 1 subjecting the tetraalkyltetrazene while in the gas phase to photolytic decomposition.

References Cited in the file of this patent

Byrkit et al.: Ind. Eng. Chem. Scientific Library, vol. 42 (1950), p. 1862.

Sidgwick: "Organic Chemistry of Nitrogen," Div. 6 Oxford, Clarendon Press (1937), page 465.